United States Patent Office 2,898,321
Patented Aug. 4, 1959

2,898,321

VULCANIZATION OF BUTADIENE RUBBERS WITH PHENOL-ALDEHYDE REACTION PRODUCTS AND PRODUCT OBTAINED THEREBY

Alvin F. Shepard, Le Roy, N.Y., assignor to Hooker Chemical Corporation, a corporation of New York No Drawing. Application January 26, 1955
Serial No. 484,303

10 Claims. (Cl. 260—43)

The present invention relates to the vulcanization of 1,3-butadiene polymers by means of aryl hydroxide-aldehyde condensation products. More particularly, the present invention relates to a process for obtaining new and useful vulcanized materials which are the reaction products between a butadiene rubber of the aforesaid type and a new class of vulcanizing agents which are the condensation products of substituted phenols with formaldehyde. Additionally, it relates to the resulting products which possess both physical and chemical properties superior in many respects to the products resulting from the vulcanization of butadiene rubbers with the conventional vulcanizing agent, sulfur.

The term "1,3-butadiene polymer" used above and throughout the specification including the claims embraces within its scope polymers of 1,3-butadiene, copolymers of 1,3-butadiene, and admixtures of the two. Examples of copolymers of 1,3-butadiene include such synthetic rubbers as butadiene-styrene copolymers and butadiene-acrylonitrile copolymers referred to hereinafter as GRS and GRN rubbers, respectively.

Many attempts have been made to combine the prominent properties of the two classes of materials, the elastomers on one side and the phenolic plastics on the other, in such a way as to produce new materials of outstanding properties. These attempts have ranged all the way from a crude mixture of ground rubber as a filler in the phenolic molding compositions, or ground phenolic material as a filler in the rubber compositions, to the other extreme of forming new chemical compounds by combining representatives of the two classes chemically through a formation of primary valence bonds.

It is well-known that, in the rubber industry as well as in the industry producing phenolic condensation products, the art has progressed much faster than the science, and this is even more true for the combination of these two fields, and much confusion exists regarding the interpretation of the phenomena observed when substances of these two classes are mixed or reacted with each other. The most scientific approach towards explanation of the phenomena occurring seems to be contained in two publications, one by Van der Meer, "The Vulcanization of Rubber with Phenol-Formaldehyde Derivatives," Naamlooze Vennootschap W.D., Meinema, Delft, and the other by Wildschut, Rec. trav. chim. 61, 898 (1942).

Wildschut investigated among other things the vulcanization of natural rubber by means of condensation products of p-tertiary amyl phenol with formaldehyde. He established the criteria for distinguishing between the results of intermingling the highly polymerized or condensed chains of rubber and resin molecules on one side, from a combination by means of cross-linking between them leading to a true vulcanization on the other. He offered proof of the correctness of his conceptions by investigating the solubility of mixtures of natural rubber on one side, and a paraffin "Oppanol" (polyisobutylene), on the other side, with his resins by subjecting the mixtures to the action of various solvents after heating.

Van der Meer investigated the reaction of natural rubber with the condensation products of numerous phenols with formaldehyde. He interpreted his results mostly on the basis of Wildschut's work and reached conclusions very similar to those of Wildschut.

The conclusion of these two investigators may be summarized as follows:

(1) Any mixture of a phenolic condensation product with rubber tends to increase, to a greater or lesser extent, the hardness, and tends to push it in a direction which would appear, on the surface, to approach a vulcanization.

(2) A true vulcanization, however, requires the cross-linking of the rubber hydrocarbon chains by means of the condensation products.

(3) Such cross-linking can occur only when the phenolic resins have at least two methylol groups per molecule.

(4) Not all condensation products having at least two methylol groups will vulcanize rubber.

(5) Those that do, will vulcanize rubber in a varying degree, ranging from a hardly perceptible vulcanization toward a vulcanization almost as good as that obtained with the classical rubber vulcanizing agent, sulfur.

(6) The difference in the degree of vulcanization obtained is explainable by the difference in the ratios of the rate of reaction between resin-resin on one side and resin-rubber on the other side. In other words, some resins condense with themselves, through their methylol groups, before they have an appreciable chance to react with rubber, resulting in inappreciable vulcanization. On the other end of the scale are those resins which have no tendency to condense with themselves, so that they are completely available for cross-linking the rubber molecules resulting in a high degree of vulcanization.

The scientific work of Wildschut and Van der Meer has found much attention in the rubber industry and their experiments have been repeated and extended in many industrial laboratories. The results of these experiments have not, however, led to any important industrial use, mainly because the phenols tested by them, comprising practically all of the phenols industrially available at that time, did not offer any technical or economical advantage over the customary vulcanizing agents such as sulfur and sulfur derivatives. Furthermore, the experiments referred, with the exception of a few experiments done with synthetic rubbers by Wildschut, almost exclusively to the vulcanization of natural rubber. The physical properties of natural rubber vulcanized with sulfur or sulfur derivatives are such that major improvements can hardly be expected from the use of condensation products instead of sulfur.

In accordance with the foregoing statement, if it were possible to generalize from the teaching of Wildschut and Van der Meer, who were interested in the vulcanization of natural rubber, and to apply their teaching to the vulcanization of butadiene rubbers, it would not be expected that the properties of the resultant products would in many cases be superior to the properties of a butadiene rubber vulcanized with the conventional vulcanizing agent, sulfur.

It is, however, an object of the present invention to improve the physical and chemical properties of butadiene rubbers by vulcanizing them with aryl hydroxide-formaldehyde condensation products.

A further object of the present invention is to provide a vulcanized butadiene rubber and a process for producing the same, which vulcanized product possesses physical and chemical properties superior to those obtained with the customary vulcanization agents normally employed for vulcanizing butadiene rubbers.

A further object of the present invention is to improve the physical and chemical properties of the elastomers of the butadiene rubbers by vulcanization by means of aryl hydroxide-formaldehyde condensation products, alone or in combination with the customary vulcanizing agents, over and above the range of physical and chemical properties obtainable with the customary vulcanizing agents alone.

These and other objects will become more apparent upon considering the description of the present invention as set forth hereinafter.

In accordance with the present invention, I have discovered that when certain condensation products of certain substituted phenols with formaldehyde are intimately admixed with the polymers of 1,3-butadiene and subjected to an elevated temperature, the resultant products possess physical and chemical properties superior to those obtainable with the customary vulcanizing agents. This invention involves a number of unexpected findings:

(1) The physical and chemical properties of butadiene rubbers can be improved over and above those obtained with any of the customary vulcanizing agents, an observation which could not be expected from the facts published by Wildschut and Van der Meer who succeeded in vulcanizing natural rubber to a considerable extent, but never so far as to make the obtained products superior to those resulting from the use of sulfur as the vulcanizing agent.

(2) Condensation products of phenols and formaldehyde which are hardenable to the insoluble and infusible state have been proposed for mixture with high molecular substances including natural rubber to obtain homogeneous products. Contrary to this, I have discovered that reaction products which are non-resols are excellent vulcanizing agents for artificial rubbers.

A resol as defined by Carleton Ellis in "Chemistry of Synthetic Resins" (Reinhold Publishing Corp., New York, New York, 1925), page 335, and as used in the instant specification and claims, is "a resin of the type hardenable by heat to a final and insoluble condition, but reacted only to the stage where it still melts when heated." 3,5-disubstituted phenols are included among the type under consideration and are classified as Type III phenols according to the conventional classification system which is described in "The Chemistry of Commercial Plastics" (Reinhold Publishing Corp., New York, New York, 1947), R. L. Wakeman, pages 121–123. As Type III phenols, they combine with formaldehyde in an alkaline solution under normal conditions to give resols. However, among the 3,5-disubstituted phenols are those which form the subject of the present invention. These phenolic compounds do not form resols even when reacted with more than one mol of formaldehyde per mol of phenol, but yet have been determined to be, in accordance with the present invention, excellent vulcanizing agents.

That these phenols do not form resols in spite of the fact that all three reactive positions are unsubstituted may be best explained by the theory that the presence of relatively large substituent groups on both sides of the p-position creates steric hindrance which prevents the p-position from reacting. Since its p-position cannot engage in cross-linking, the phenol cannot form a resol.

The point here made is, therefore, that, contrary to the teaching of the prior art, the vulcanizing agents of the present invention need not be resols, but instead may be non-resols.

(3) The prior art taught that the suitability of condensation products as additives to high molecular substances depends mostly on the number of carbon atoms in their side chains. According to the prior art, a minimum of four in certain cases, but, in general, five carbon atoms are required to make the resins suitable for mixing with rubber-like substances. This observation was found to be incorrect. Thus 3,4,5-trimethylphenol has only a total of three carbon atoms in its substituents, and yet formaldehyde derivatives of this phenol make excellent vulcanizing agents for GRS rubber, as disclosed in my co-pending application Serial No. 420,747, filed April 2, 1954, now Patent No. 2,813,843, issued November 19, 1957.

(4) The prior art advanced the theory that compatibility of resins with high molecular substance is identical with their ability to react with them, which latter ability is identical with their ability to cross-link them. It was overlooked that this teaching tries to wipe out the obvious differences of three obviously distinct steps in the behaviors of two substances toward each other. Substances are compatible with each other if their chemical and physical properties are sufficiently alike. No chemical combination between them is necessary and similarity in their physical and chemical properties militates normally against a chemical combination. An example of purely physical compatibility can be found, for instance, in the mixture of petroleum oil with GRS compositions. The next step would be a chemical combination between different substances held together with one chemical main valence bond. An example of the combination of this type is, the combination of hydrogen with rubber to form a hydrogenated rubber, which is certainly a true chemical compound, but which does not produce vulcanization. Vulcanization is the third step in which one molecule of the vulcanizing agent and two molecules of the rubber combine chemically, resulting in a cross-linking of the rubber chains.

I have found a great number of exceptions to the rule laid down by the prior art. Condensation products of m-pentadeclyphenol with formaldehyde are excellently compatible with GRS rubbers, but fail to vulcanize them. The dimethylol compound of 3,5-xylenol, for instance, is imperfectly compatible with GRS rubber, but nevertheless gives a vulcanized GRS of high quality. The prior art further teaches that reactivity with rubber is the greater, the smaller the molecule is. This teaching too does not hold true for GRS rubbers. A high molecular resin prepared from tertiary amyl phenol, having a molecular weight of approximately 1000, is a better vulcanizing agent than the corresponding dialcohol having a molecular weight of 210.

The teachings of the prior art covers an almost infinite number of high molecular substances including allegedly all types of rubbers both natural and synthetic, and an infinite number of phenol-aldehyde condensation products. It is surprising, with an infinite number of combinations possible, a single case was not found in which true vulcanization of a butadiene rubber with a phenol-formaldehyde condensation product occurred, but actually such is the case. The prior art workers investigated several rubber-phenolic condensation product mixtures and the usual influence of the resin upon the physical and chemical properties of the rubber was observed. Specifically, it was observed that natural rubber, vulcanized in the presence of certain resins, gave properties superior to rubber vulcanized in the same way in the absence of such resins, but it was never observed explicitly that certain resins actually do vulcanize rubber. The closest the prior art came to making this observation was when the formaldehyde condensation product of 3-methyl-5-isopropylphenol was mixed with natural rubber, a vulcanizing agent, filler, etc., and it was observed that the product has a higher tensile strength than a product obtained from the same starting materials without the resin. Whether in this case true vulcanization of the natural rubber was obtained by means of this particular resin appears doubtful. Van der Meer states in his book on page 15, last line, and on page 16, lines 1 to 7, a prior observer "indicated that it is possible in some instances to vulcanize rubber by means of a resol but he indicated also that in these cases too, the addition of the customary vulcanizing agent such as sulfur is preferable. From his investigation it is not apparent whether or not one can speak of a chemical reaction between rubber and resol."

Specifically, in accordance with the present invention, I have discovered that 1,3-butadiene polymers may be vulcanized with a vulcanizing agent which is a non-resol and which is the reaction product of at least 1.2 mols of formaldehyde per mol of phenol of the general formula:

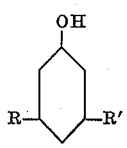

wherein R and R' are alkyl groups, and R and R' together contain collectively a total of at least five carbon atoms.

As will be shown hereinafter, the vulcanized materials of the present invention as produced in accordance with the process of the present invention obtain chemical and physical properties which exceed those obtainable when vulcanizing butadiene rubbers with the use of conventional vulcanizing agents.

Phenols represented by the general formula:

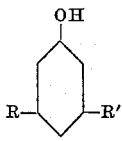

wherein R and R' are alkyl groups and contain collectively a total of at least five carbon atoms, and which phenols form non-resols even when condensed with more than one mol of formaldehyde per mol of phenol, may be exemplified by 3,5-diisopropylphenol, 3-ethyl-5-isopropylphenol, and 3-ethyl-5-sec-butylphenol.

The vulcanizing agents of the present invention are in general prepared by reacting an excess of formaldehyde with phenol, i.e., at least 1.2 mol of formaldehyde per mol of phenol, in the presence of an alkaline catalyst such as sodium hydroxide at temperatures up to the boiling point of the reaction mixture for a period of time which is selected in accordance with the particular average molecular weight desired. Specific examples presented hereinafter will illustrate time factors required for the particular temperature employed in order to obtain reaction products of suitable molecular weight. Upon completion of the reaction, the product may be dehydrated and used as such, or it may be neutralized with a weak acid such as acetic acid, washed with water to remove salts, and dried. The molecular weight, melting point and other properties of the product may be modified by heating it so as to split off either water alone or water and formaldehyde.

The above methods of producing the vulcanizing agents of the present invention may be advantageously modified in order to obtain mononuclear dialcohols. In general, the modification comprises utilizing Methyl Mormcel (a 40% solution of formaldehyde in methanol). Specific details of a satisfactory method for obtaining individual mononuclear dialcohols are presented in the examples hereinafter.

The chemical significance of the method of producing these vulcanizing resins, the limitation in their composition, and their ability to vulcanize, may be explained according to the work of authors like Zinke and others [Carswell, T. S., "Phenoplasts" (pp. 20–24), Interscience Publishers, Inc., New York, 1947], by the following theory. It should be understood here that I do not want to be limited, however, by this theory, but offer it only as a possible explanation for the facts which constitute this invention.

Resins having the ability to vulcanize rubber, according to the present invention, must have, according to this theory, at least two active groups per molecule.

Active groups may be of two types. One is the methylol group such as occurs, for instance, in the dialcohol,

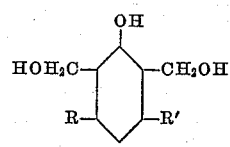

in the dinuclear compound,

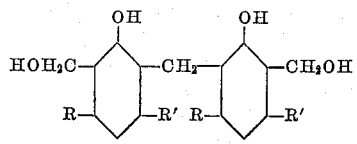

or in equivalent structures.

The second type of active group is the methylene ether group, formed by splitting off water between any two methylol groups of adjacent molecules of the compounds above.

My observations can be interpreted as indicating that, during the process of vulcanization, each methylene ether group effects vulcanization to a degree equivalent to two methylol groups.

The active groups can be attached to one phenolic nucleus, as in the case of the dialcohol, or they can be attached at various points to molecules containing connected phenolic nuclei. Compounds containing less than 1.2 mols of formaldehyde per mol of phenol have either an insufficient concentration of active groups or contain the active groups at too great a distance from each other to permit an efficient vulcanization of rubber, as disclosed by the present invention.

The reaction products prepared according to this invention need not contain either methylene or methylene-ether linkages exclusively to connect the phenolic nuclei. When the products are prepared commercially, without any special precautions taken to limit the structure to either one type or the other, they will generally contain linkages of both the methylene and methylene ether types.

It has been found that satisfactory vulcanizing action is obtained only when the molecular ratio of formaldehyde to phenol is at least 1.2:1. The tabulated data presented below will illustrate the criticality of using a reaction product having a formaldehyde to phenol ratio of at least 1.2:1. The data set forth were obtained with reaction products of formaldehyde and 3,5-diisopropylphenol, using varying formaldehyde to phenol ratios, by employing them as curing agents for a GRS carbon black rubber comprising approximately 66 parts by weight of GRS rubber and 33 parts by weight of carbon black. In all cases, 10% by weight of curing agent was intimately admixed with GRS carbon black rubber and the mixture was cured under pressure for a maximum of 2 hours at a temperature ranging between 163 and 168° C. In some cases the dialcohol was used, in others a resin was prepared by heating the dialcohol, and in still others a resin was prepared by directly condensing the phenol with formaldehyde.

| Condensation Product | Molecular Ratio of Formaldehyde to Phenol | Mol. Wt. | Melting Point, °C. | Tensile Strength of Vulcanized Rubber at Optimum Cure, lbs./in.² |
|---|---|---|---|---|
| Dialcohol | .2:1 | 238 | 93–94 | 3,130 |
| Resin from Dialcohol | 1.99:1 | (indet.) | 185–200 | 2,160 |
| Resin | 1.8:1 | 412 | (oil) | 3,430 |
| Do | 1.3:1 | 865 | 70 | 3,500 |
| Do | 1.2:1 | 1,140 | 100 | 3,450 |
| Do | 1.2:1 | 1,415 | 145 | 2,830 |
| Do | 1.1:1 | 1,910 | 170 | No cure |

As shown in this table, the maximum vulcanizing action obtained by utilizing a reaction product of formaldehyde and 3,5-diisopropylphenol occurred at a formaldehyde to phenol ratio of about 1.3:1. When vulcanizing agents made from other phenols are utilized, the optimum vulcanizing ability may be realized when the ratio value of formaldehyde to the phenol is different from 1.3:1. However, in all cases the ratio used must have a value of at least 1.2:1.

In general, polymers of butadiene, copolymers of butadiene and admixtures of polymers and copolymers of butadiene may be vulcanized in accordance with the present invention by intimately admixing a relatively small percentage by weight of the selected vulcanizing agent of the present invention in the rubber to be vulcanized and subjecting the resultant admixture to an elevated temperature. As in the case of vulcanizing butadiene rubbers with sulfur, it is advisable to include a reinforcing type filler in order to obtain vulcanizates of high tensile strength. Among the many reinforcing fillers, carbon black made by the channel process is considered the most outstanding one. However, suitable reinforcing fillers include furnace-type carbon blacks, soft gas blacks, zinc oxide, magnesium carbonate, calcium silicate, whiting, hard clays, silica, et cetera.

The physical properties of polymers of butadiene, copolymers of butadiene and admixtures of the same vary from those which are relatively tough and nervy such as GRN to those which are relatively more soft and easily workable such as GRS compositions which are specifically designed for easy workability. Thus the selection of any particular butadiene rubber will dictate the degree of breakdown necessary. Temperature becomes an increasingly important factor generally as the degree of breakdown necessary increases. The conventional Banbury mixer or other rubber compounding machines are suitably equipped for controlling the temperature of breakdown.

Upon completion of the breakdown period, fillers, if not previously incorporated, are added, as are pigments, plasticizers, anti-oxidants, et cetera. In general, where the temperature of breakdown is high, it may prove desirable to add the vulcanizing agents of the present invention after the addition of the other agents. Such an order of addition may serve to eliminate premature vulcanization. In conventional synthetic rubber compounding, it is the usual practice to use sulfur as the vulcanizing agent. To promote the vulcanizing action of sulfur, it is customary to add an organic accelerator such as, for example, "Santocure," which is said to be N-cyclohexyl-2-benzothiazylsulfenamide. An inorganic accelerator such as zinc oxide is also included. Then, to activate the zinc oxide in such a way that it will accelerate sulfur vulcanization, it is desirable to add a fatty acid such as stearic acid. Furthermore, since the synthetic rubbers do not break down readily in processing, it is difficult to incorporate the aforesaid compounding agents in the rubber, and consequently, it is general practice to add a softener such as a hydrocarbon oil to improve processing. Finally, since sulfur vulcanizates tends to degrade under the action of heat and oxygen, age-resistors such as "BLE" are added. "BLE" is a reaction product of diphenylamine and acetone in the form of a non-volatile amber-colored liquid with a specific gravity of 1.087.

The vulcanizing agents of the present invention have a four-fold function. First, they act as plasticizing agents. In ordinary processing when sulfur is used as the vulcanizing agent, it is customary to add, in addition to the sulfur, one of the common plasticizing agents to soften up the rubber to the point where it can be easily worked. After the processing, the plasticizer remains in the rubber as a foreign substance, in many cases imparting undesirable properties to the rubber. However, when the resins of the present invention are used, they act as plasticizing agents, allowing the rubber to be worked in the absence of additional plasticizing agents. Then, after they have served their purpose as plasticizing agents, they enter into the vulcanizing process, so that there are no plasticizing agents left in the finished product as foreign substances.

Second, they eliminate the need for the agents described above. Third, they serve as vulcanizing agents. Finally, they serve as antioxidants, protecting the ultimate product from the action of heat and oxygen. The antioxidants and accelerators may, however, be added in the conventional manner when it is desired to enhance the specific properties over and above that degree obtainable by the use of the resin alone, but the advantage of the use of the resin is still manifested inasmuch as a smaller amount of these agents may be used when used in conjunction with the resin.

Selection of the amount of vulcanizing agent in accordance with the present invention is governed by the characteristics of the product desired as well as the selection of the particular butadiene polymer, copolymer, or admixture of the same. Where it is desirable that the characteristics of the butadiene rubber predominate in the resulting product, it is advisable to employ minimum quantities of the vulcanizing agents of the present invention. For example, a composition including 2% by weight of a vulcanizing agent of the present invention when vulcanized has exceptionally good tensile strength. An increase of the percentage composition by weight of the vulcanizing agent increases the hardness and the elastic modulus while decreasing the percentage elongation of the product. Increasing the phenolic resin content to, for example, 30%, will obtain a product of greater hardness, greater elastic modulus, lower percent elongation, greater heat resistance and improved surface finish. From the foregoing, it will be apparent many factors govern the selection of the amount of vulcanizing agent to be incorporated in the butadiene rubber prior to vulcanization. Examples presented hereinafter will illustrate some of the variations of properties obtainable by a choice of varied amounts of vulcanizing agents.

The products of the present invention exhibit high tensile strength, in many cases almost 4,000 pounds per square inch, high elongation, and excellent solvent resistance of such solvents as benzene, toluene, carbon tetrachloride, etc. Unlike sulfur vulcanizates, they show no tendency to bloom and they are highly resistant to change in mechanical and electrical properties on heat aging.

Although the following examples employ a GRS type rubber for the purpose of demonstrating the vulcanizing ability of the vulcanizing agents of the present inevntion, other 1,3-butadiene polymers including polybutadiene and GRN are vulcanizable with the vulcanizing agents of the present invention and comparable results are obtained. Examples of GRN polymers include such proprietary products as Hycar and Chemigum.

*Example 1*

A mixture of 750.1 gm. of 1,3,5-triisopropylbenzene and 0.75 gm. of powdered caustic soda was placed in a glass flask, and maintained at about 80° C. A steady stream of dry air was passed through the liquid by means of a fritted glass bubbler. After traveling through the liquid, the exit air was passed through a condenser maintained at 80° C. to retain the hydrocarbon carried along the air stream. The resulting triisopropylbenzene monohydroperoxide was purified by fractional distillation.

A mixture of 1550 gb. of 1,3,5-triisopropylbenzene hydroperoxide and about 617 gm. of 1,3,5-triisopropylbenzene was placed in a three-neck flask provided with an agitator, dropping funnel and outlet to a condenser and chilled receiver. The mixture was maintained at 50–60° C. and to it was added, over a three-hour period, a solution of 23 gm. toluene sulfonic acid in 150 gm. 1,3,5-triisopropylbenzene. After further reacting for one-half hour at 50–60° C., the mixture contained less than 0.3% hydroperoxide. The bulk of the acetone was removed from the solution by simple distillation, the remainder being recovered by adding about 45 gm. of water to the reactor and continuing distillation. Total acetone recovery was 296 gm., 77% of theory.

The remaining solution was mixed with a solution of 400 gm. potassium hydroxide in 500 gm. water and steam-distilled to recover the 1,3,5-triisopropylbenzene. The alkaline solution was neutralized, ether extracted, and the resulting 3,5-diisopropylphenol (596 gm. or 51% of theory) was recovered by distillation. The 3,5-diisopropylphenol so recovered has a freezing point of 47° C. By fractional distillation of the crude 3,5-diisopropylphenol in vacuum, a product was obtained having a freezing point of 52.4° C.

(A) The dimethylol compound, or "dialcohol" of 3,5-diisopropylphenol was prepared by the reaction between one mol of the above phenol and ten mols of formaldehyde (as a 40% methanolic solution) in the presence of one mol of KOH (in the form of a 57.5% aqueous solution). After 47 hours at room temperature, an analysis of a sample drawn from the reaction showed that two mols of formaldehyde had reacted. The reaction product was treated with a slight excess of dilute sodium sulfite solution and made slightly acid by the addition of dilute hydrochloric acid. A crystalline precipitate formed and was filtered off, washed with n-hexane, and crystallized from cyclohexane to a melting point of 93–94° C. An analysis of this material showed a carbon content of 70.66% and 70.59%; and a hydrogen content of 9.13% and 8.94%. The calculated carbon content of 3,5-diisopropyl-2,6-dimethylolphenol is 70.55%; hydrogen content 9.3%.

Ten percent by weight of this dialcohol of 3,5-diisopropylphenol was incorporated into GRS 1601 type rubber, and thoroughly milled and cured at 165° C. for 45 minutes. GRS 1601 type rubber is a GRS rubber masterbatched with HAF Black in the proportion by weight of 50 parts HAF Black to 100 parts polymer. HAF Black is a high abrasion furnace black. The cured rubber had a tensile strength of 3130 lbs./in.$^2$ and an elongation of 660%. A sample cured for 75 min. had a tensile strength of 3660 lbs./in.$^2$. Another sample was cured in a similar manner using only 5% of dialcohol plus 5% of zinc oxide. This vulcanizate had a tensile strength of 4000 lbs./in.$^2$ and elongation of 740%.

(B) A resin of 3,5-diisopropylphenol was prepared by heating the dialcohol of the phenol to 120° C. for 10 min. During this heating, the material lost 60 mol percent water, a negligible amount of formaldehyde (less than 1%) and formed a white brittle resin melting at 185–200° C. The limited solubility of this resin in common solvents made a cryoscopic molecular weight determination inconvenient.

Five percent by weight of this resin was incorporated into GRS rubber in the same manner as in Example 1(A). This produced a vulcanizate having a tensile strength of 2160 lbs./in.$^2$ and 490% elongation.

(C) A resin was prepared directly from 3,5-diisopropylphenol and formaldehyde without first preparing the dialcohol. One mol of phenol was reacted with four mols of formaldehyde (40% methanolic) and one mol KOH. After 68 hours at room temperature, formaldehyde had been taken up to an extent of 1.86 mols per mol of phenol. The product was liberated by the neutralization of the excess formaldehyde with sodium sulfite and acidification with dilute hydrochloric acid. It was an oily resin having a molecular weight of 375, as determined in dioxane by the usual cryoscopic methods. This molecular weight indicates the resin to be mostly the dinuclear compound with some dialcohol.

Ten percent of this resin was incorporated into GRS rubber by the method outlined above. The tensile strength of the vulcanizate was 3430 lbs./in.$^2$ and elongation was 560%.

(D) Another resin of higher molecular weight (average 1140) was prepared by reacting one mol of 3,5-diisopropylphenol with 1.25 mols of formaldehyde (37% aqueous) and 0.08 mol NaOH (50% aqueous). The reaction mixture was refluxed until a resin formed and until about 1.2 mols of formaldehyde had been combined. The resin was solid on cooling and was ground and dried to constant weight in vacuo. It had a melting point of 100° C. and a molecular weight of 1140, as determined cryoscopically in dioxane.

Ten percent of this resin was incorporated into GRS rubber by the method described above. The tensile strength of the vulcanizate was 3560 lbs./in.$^2$ and elongation was 720%.

*Example 2*

The procedure described by Carpenter (U.S. Patent 2,064,885) was followed essentially in the propylation of m-ethylphenol with isopropylchloride to give 3-ethyl-5-isopropylphenol. One mol of m-ethylphenol, 1.1 mols isopropylchloride, 1.5 mols aluminum chloride and 450 gm. ethylene dichloride were used. The phenolic distillation product collected at 108–110° C. at 3 mm. was recrystallized from petroleum ether to give crystals melting at 44–45° C. The carbon content of the crystals proved to be 81.12% and hydrogen content 9.7%. The carbon content calculated for 3-ethyl-5-isopropylphenol is 80.54%, hydrogen content 9.82%. Reaction of the new phenol with 3,5-dinitrobenzoyl chloride gave a crystalline compound melting at 73–74° C. An analysis of this compound showed the following composition: carbon 60.81%, hydrogen 5.13%, nitrogen 8.17%. The theoretical values calculated for 3-ethyl-5-isopropylphenol-3,5-dinitrobenzoate are: carbon 60.33%, hydrogen 5.07%, nitrogen 7.82%.

One mol of 3-ethyl-5-isopropylphenol was reacted with two mols of formaldehyde (as 40% methanolic solution) in the presence of one mol of NaOH at 43° C. over an 18 hour period. At the end of this time, 1.8 mols of formaldehyde had reacted, and the addition of a sulfite solution and neutralization with acid freed an oily resin have a molecular weight of 245.

This resin was thoroughly milled into GRS, 1601 type rubber giving a mixture containing 10% of the resin by weight. This sample, cured in the usual manner for 1 hour, had a tensile strength of 3050 lbs./in.$^2$ with an elongation of 780%.

*Example 3*

Butylation of m-ethylphenol by a procedure completely analogous to that described above gave a new phenol, 3-ethyl-5-sec-butylphenol. One mol of m-ethylphenol was reacted with 1.1 mols of 2-chlorobutane in 470 gm. ethylene dichloride with 1.5 mols of aluminum chloride as a catalyst. The reaction was more sluggish than that with m-cresol, requiring 2½ hours' heating. Fractional distillation of the washed product yielded a phenol boiling at 132.5–133° C. at 10 mm. pressure. Analysis showed carbon contents of 81.21% and 81.13% and hydrogen contents of 10.24% and 10.27%. The carbon content calculated for 3-ethyl-5-sec.-butylphenol is 80.85% and hydrogen content is 10.18%. This phenol gave a 3,5-dinitrobenzoate derivative melting at 78–79° C., which was analyzed as follows: carbon 61.08%, hydrogen 5.28%, nitrogen 7.78%. These values when calculated for 3-ethyl-5-sec-butylphenyl-3,5-dinitrobenzoate are: carbon 61.28%, hydrogen 5.41%, and nitrogen 7.52%.

A resin was prepared by reacting one mol of 3-ethyl-5-sec-butylphenol with two mols of formaldehyde (37% aqueous) in the presence of 0.0375 mol NaOH catalyst. The mixture was heated at 40° C. for four hours, giving a resin containing 1.34 mols of formaldehyde per mol of the phenolic compound. Its molecular weight of 340 indicates that the resin is essentially a mixture of about equal parts dialcohol and its dinuclear compound.

The vulcanizing potential of this resin was tested in the usual manner, 10% of it by weight being milled into GRS. After a cure of one hour at approximately 165° C., the vulcanized material had a tensile strength of 1840 lbs./in.$^2$ and an elongation of 770%.

What is claimed is:

1. A method of vulcanizing a vulcanizable rubbery 1,3-butadiene polymer which comprises the steps of intimately admixing in the polymer a fusible vulcanizing agent which is the reaction product of at least 1.2 mols of formaldehyde per mol of a phenol which when reacted under mild conditions with an excess of formaldehyde and in the presence of an alkaline catalyst forms a fusible condensation product which remains fusible upon heating, the phenol being of the general formula:

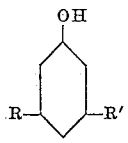

wherein R and R' are lower alkyl groups containing individually at least two carbon atoms and collectively a total of at least five carbon atoms, the carbon atom attached to the benzene ring in at least one of the alkyl groups being attached to a total of at least three carbon atoms including the carbon atom on the benzene ring, and vulcanizing the resulting admixture by heating to a vulcanizing temperature.

2. A method of vulcanizing a vulcanizable rubbery 1,3-butadiene polymer which comprises the steps of intimately admixing in the polymer a fusible vulcanizing agent which remains fusible upon heating and is the reaction product of at least 1.2 mols of formaldehyde per mol of phenol selected from the group consisting of 3,5-diisopropylphenol, 3-ethyl-5-isopropylphenol and 3-ethyl-5-sec-butylphenol, and vulcanizing the resulting admixture by heating to a vulcanizing temperature.

3. A method of vulcanizing a vulcanizable rubbery 1,3-butadiene polymer which comprises the steps of intimately admixing in the polymer a fusible vulcanizing agent which remains fusible upon heating and is the reaction product of at least 1.2 mols of formaldehyde per mol of 3,5-diisopropylphenol and vulcanizing the resulting admixture by heating to a vulcanizing temperature.

4. A method of vulcanizing a vulcanizable rubbery 1,3-butadiene polymer which comprises the steps of intimately admixing in the polymer a fusible vulcanizing agent which remains fusible upon heating and is the reaction product of at least 1.2 mols of formaldehyde per mol of 3-ethyl-5-isopropylphenol and vulcanizing the resulting admixture by heating to a vulcanizing temperature.

5. A method of vulcanizing a vulcanizable rubbery 1,3-butadiene polymer which comprises the steps of intimately admixing in the polymer a fusible vulcanizing agent which remains fusible upon heating and is the reaction product of at least 1.2 mols of formaldehyde per mol of 3-ethyl-5-sec-butylphenol and vulcanizing the resulting admixture by heating to a vulcanizing temperature.

6. The vulcanized material produced by the method of claim 1.

7. The vulcanized material produced by the method of claim 2.

8. The vulcanized material produced by the method of claim 3.

9. The vulcanized material produced by the method of claim 4.

10. The vulcanized material produced by the method of claim 5.

References Cited in the file of this patent

UNITED STATES PATENTS

| | | |
|---|---|---|
| 2,165,380 | Honel | July 11, 1939 |
| 2,211,048 | Bitterich | Aug. 13, 1940 |
| 2,732,368 | Shepard | Jan. 24, 1956 |
| 2,813,843 | Shepard | Nov. 19, 1957 |

OTHER REFERENCES

Shepard et al.: "Modern Plastics," October 1946, pages 154–156, 210 and 212.

Phenoplasts, by T. S. Carswell, Interscience Publishers Inc., 215 Fourth Avenue, New York 3, New York (1947), page 29.